Aug. 2, 1966  E. W. MERRILL  3,264,393

METHOD OF MOLDING SEALING GASKETS FOR CONTAINERS

Original Filed April 15, 1963  2 Sheets-Sheet 1

Aug. 2, 1966  E. W. MERRILL  3,264,393
METHOD OF MOLDING SEALING GASKETS FOR CONTAINERS
Original Filed April 15, 1963  2 Sheets-Sheet 2

United States Patent Office 3,264,393
Patented August 2, 1966

3,264,393
METHOD OF MOLDING SEALING GASKETS
FOR CONTAINERS
Edward W. Merrill, Belmont, Mass., assignor to W. R.
Grace & Co., Cambridge, Mass., a corporation of
Connecticut
Original application Apr. 15, 1963, Ser. No. 272,895.
Divided and this application Sept. 27, 1963, Ser.
No. 312,262
3 Claims. (Cl. 264—236)

This application is a division of application Serial No. 272,895 filed on April 15, 1963.

This invention relates to sealing gaskets for containers. In one aspect, it relates to a preformed continuous band which is particularly applicable in preserving foods in hermetically sealed containers and which is adapted to assist release of the cover by simply stripping the band out of the sealing area.

Proper packaging of process foods is imperative to protect the product from oxygen as well as bacteria. Processing involves cooking the product in a sealed container of metal, glass or other material at a temperature and for a time sufficient to destroy all organisms that might cause spoilage. Oxygen is undesirable in the sealed container as it may react with the food and the metal closure and directly affect the quality and nutritional value of the food. Glass containers fitted with metal closures are used extensively to hermetically seal a wide variety of foods as the glass is not subject to oxidative attack and the package product is visible.

Sealing compositions of various sorts are used to provide a hermetic seal between the container and closure. These compositions may be rubber solutions, rubber latices, vinyl chloride plastisols or other materials with similar resilient properties. They are applied in a fluid state by lining the periphery of the inside surface of a closure element and drying the lined element in an oven. Upon heating, the composition is transformed into a continuous rubbery mass which acts as a gasket and insures an airtight seal between the closure and the container.

Rotatable closure caps are commonly used with glass containers. These are usually made of lacquered tinplate and include, among others, the screw type, lug type, and the combination band and panel type. The various rotatable caps differ chiefly in the means by which the cap is held firmly in place on the container. Such means include a continuous or discontinuous thread, projecting lugs, etc., located near the container opening and are adapted to mate in threaded engagement with the cap as it is rotatably advanced to bring the gasket into sealing relationship with the mouth of the container.

In sealing a jar with a closure, air is exhausted from the headspace above the contents in closing machines which produce a vacuum either mechanically or by the condensation of steam. In closing the container, the torque must be sufficient to resist retractive movement during shipment and/or storage. Any such movement is undesirable as it is apt to break the seal and cause leaks through which spoilage organisms will gain access to the contents of the container.

The torque removals for vacuum-packed containers vary widely, but it is well known that some containers, such as baby food jars have their caps so firmly attached that it is necessary to resort to fairly drastic means to effect their removal, such as thumping the cap on a shelf, or using a wrench or other awkward means. In other cases, the caps are so loosely attached that only a slight twist is required to remove the cap from the container. This is objectionable in that the container is subject to tampering while stored on shelves by customers who remove the cap to examine the contents and then replace the container on the shelf. It is obvious that such opening breaks the seal and exposes the contents to the atmosphere with the result that spoilage will gradually occur.

The gasket of this invention is comprised of a continuous band formed of a single longitudinal strip of a resilient material, preferably an elastomer. One end of the strip is severably joined to the body of the strip a distance from its opposed end whereby the opposed end extends tangentially as a tail. To open a closed container sealed with the gasket of this invention, the tail is grasped between the thumb and forefinger and pulled in a direction away from the container. The pulling action severs the bond between the tail and body portion of the band and the gasket is then simply stripped from the area between the cap and the container. Upon stripping the gasket, the vacuum in the container is released and the cap then fits loosely and is readily removed. The cap is firmly seated on the gasket so that the removal torque is too great for hand opening. The consumer must, therefore, first strip the gasket before the cap can be removed and once the seal is broken it cannot be restored. Consequently, the state of the gasket will indicate whether the container has been tampered with.

Figure 1:
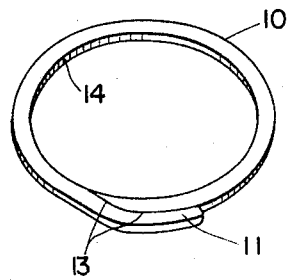
FIG. 1 is a perspective view of the gasket.
Figure 2:
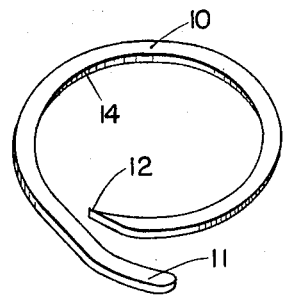
FIG. 2 is a perspective view of the gasket in its severed state.

As shown in FIG. 1, the gasket is a unitary structure and is comprised of a continuous band 10 of an elastomeric material of uniform thickness having a tangential tail 11 projecting freely therefrom. It is formed of a single longitudinal strip of material in which one end 12 is returned over (shown in FIG. 2) and is severably joined to the body of the strip a distance from the opposed end or tail 11. The juncture of end 12 and the body is a weak one and defines a diagonal tear line 13 which can be severed by simply grasping the tail 11 and pulling it in an opposed direction. The end 12 may be joined to the body by an adhesive or by the inherent bonding properties of a selected resilient material. The inside surface 14 of the band 10 is generally circular but may have any geometrical configuration which is necessary to conform or adapt itself to the contour of the outer surface of the neck of a container.

Figure 3:
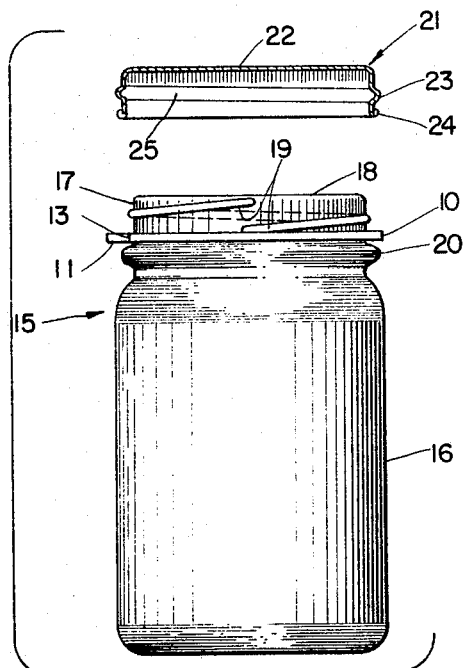
FIG. 3 is a telescopic vertical view, partly in section, showing the gasket positioned on the container before the cover is affixed thereto.
Figure 4:
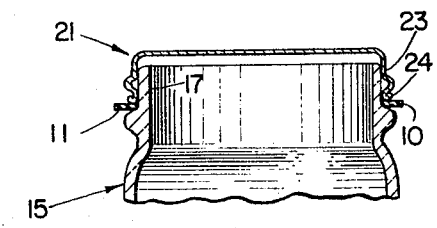
FIG. 4 is a fragmentary vertical section of the gasket interposed in sealing engagement between a cover and the neck of the container.

The use of the gasket of this invention to seal a container is illustrated in FIGS. 3 and 4. A glass container, shown generally at 15, such as a jar used in thermal processing of baby food, is provided with a body portion 16 and a neck 17. The neck consists of an opening or mouth 18 for receiving the contents, a thread 19 projecting from the wall of the neck, and a continuous rib 20 lying in a horizontal plane circumscribing the lower portion of the neck. The gasket is surmounted on the top surface of the rib 20 in which the tear line 13 extends between about 30° to 40° of the circumference of the jar. The diameter of the gasket is smaller than the diameter of the neck of the container and is stretched when it is placed on the rib and held in position by frictional contact with the neck wall when the gasket contracts.

After the gasket is fitted in place, a closure cap or cover, shown generally at 21, composed of a circular panel 22 and a depending skirt 23 terminating in a bead 24, is positioned on the mouth of the container 15. The cover 21 is rotatably advanced on the container by engagement of the thread 25 of the skirt 23 and the thread 19 of the neck 17. As the cover is advanced downwardly, the bead 24 engages and compresses the gasket against the upper surface of the rib 20 and rotation is continued until an air tight seal is formed. When the seal is completed, the cover is tightly seated against the gasket which cannot be dislodged by ordinary accidental forces and requires substantial removal torque for hand opening.

As shown in FIG. 4, the tail 11 extends beyond the sealing area and is readily accessible. When the tail is grasped and drawn away from the container, the gasket is spread along a fairly short line so that the vacuum within the jar (if it is a vacuum pack) is released which facilitates removal of the cover. Since the gasket is composed of an extensible material, the pulling action causes a reduction in its thickness with the result that the gasket can be easily stripped from between the bead 24 and the rib 20 without unscrewing the cover.

The size of the gasket and its thickness will depend upon the end use to which it will be put. It should be as thin as possible consistent with obtaining a good seal since, as the thickness is minimized, the rate of molecular diffusion of oxygen into the jar is concomitantly minimized. This is generally true regardless of the material which is used to construct the gasket. If, however, oxygen diffusion is of no consequence then this consideration is irrelevant insofar as its use is concerned.

It is known that irregularities exist in the glass finish and the edge of caps and these irregularities must be taken into account in determining the thickness of the gasket to provide a proper seal. If not, minute passages will occur through which contaminants, including bacteria, will enter the container. It is believed that the uncompressed thickness of the gasket should not be much below .050 inch to compensate for the variances which exist in commercially-available containers and caps. Of course, if one had an absolutely perfect cap and an absolutely perfect container, both flat within ±.001 inch and both circular within ±.001 inch of the radius, it would be possible to use a gasket having a thickness of only about .005 inch. This use would have the added advantage of greatly reducing oxygen permeability as compared with current practice.

Having established the criteria for minimum thickness of the gasket, its breadth should be given consideration in which the product of the breadth and the thickness combined with the radius indicate the total volume of the gasket. The breadth, that is the difference in radii between inner edge and outer edge when the gasket is laid flat, is limited by the radial accuracy with which the cap and the container can be made. In general, caps can be made quite true to a circle but glass containers are made which are elliptical to varying degrees and some have been measured which were out of true radius by as much as .020 inch. A practical working minimum breadth of the gasket of this invention of about .050 inch would compensate for most irregularities which exist in current caps and containers and still provide a good seal.

In current practice, the use of butyl ring gaskets in baby food caps measuring 48 mm. in diameter averages about 1 gm. per gasket. Plastisol compounds are in the same order of mass. A seal for a 48 mm. baby food jar made from the gasket of this invention with a cross-section .050 inch thick and .050 inch in breadth would weigh about 750 mg., which represents at least 30 percent less material over current usages.

The gasket may be constructed of any resilient material which is capable of exerting continuous pressure indefinitely against the cap and the rib of the jar. Thus, in principle, foamed or porous materials might be used provided a continuous path does not exist by which contaminants could enter the pack or the contents of the pack could move outwardly through the gasket to the outside environment. Various known forms of resilient materials could be used including blown and unblown vinyl chloride plastisols, natural and synthetic rubbers, various sponge rubbers, and such recently-introduced materials as ethylene-propylene elastomers and irradiated polyethylene and polypropylene.

For packages containing other than sterile sensitive foods, it is possible with present sealing compounds to so design them that the cover is easily removed from the container. For example, the caps on mayonnaise jars, maple syrup, and even on such packages as tomato catsup, the present caps, lined with waxed paper discs or with foamed plastisols, are relatively easy to remove. It is notably with the critical packages of meats, custards, and other protein-containing foods, irrespective of whether they are prepared for infant consumption, that the problem of absolute certainty of the seal becomes acute. This has apparently caused the cap manufacturers to design their seals with two considerations in mind: (1) that the jar cap will not be dislodged by accidental jarring as, for example, by dropping the container on the floor, and (2) that the resilient material used for the closure shall transmit oxygen and other gases to a minimum degree by molecular diffusion. The first consideration calls for formulating the composition of matter to be somewhat tacky so that it exhibits considerable friction to the cap and the glass against rotational torque. But this is precisely what makes these closures difficult to open for the average person. The second consideration points almost uniquely to one polymer, namely butyl rubber (a copolymer of isobutylene with a small amount, up to 5.0 percent, of a diolefin, such as isoprene) or other isobutylene copolymers as the preferred materials of construction. These polymers have far lower permeability to oxygen and other gases than other elastomeric substances.

In the present invention, isobutylene polymers are the preferred materials for precisely this reason. If one considers geometrically-equivalent seals placed between a metal cap and the rib of a jar, all geometrical parameters being held constant, one would find the lowest permeability of oxygen into the contents of the jar sealed with butyl rubber. The rate of oxygen diffusion into the jar would be of the order of tenfold to a hundredfold less with butyl rubber than with butadiene-styrene rubbers, neoprene, or natural rubber. Butyl rubber compounds contain carbon black for reinforcement, plasticizing oils, and the usual vulcanization agents and accelerators. Such additives do not significantly alter the diffusion characteristics of the base elastomer when used within reasonable limits.

A gasket having walls lying solely at right angles, such as one having a rectangular or square cross-section, is highly preferable to one which is round. This preference is purely for mechanical reasons in that it is virtually impossible to position the gasket accurately on the rib 20 with the tail 11 projecting outwardly if the gasket is circular in cross-section. In other words, the gasket tends to roll up and down the jar wall thereby changing the position of the tail. On the other hand, if the cross-section is square or rectangular, once the gasket is seated on the rib 20 with the tail directed outwardly it will remain in that position.

It is known that butyl rubber cord or other rubber-like cord of square cross-secition can be extruded if the side of the square is 3/16 inch or greater. On the other hand, it is quite difficult to extrude a cord of square or rectangular cross-section having a side width of between about .010 to .050 inch. Since direct extrusion of cord of desired square or rectangular cross-section is difficult, the gasket may be prepared by pressing an extruded cord of circular cross-section in a mold having a square or rectangular cross-section. Another method is to pass a cord of circular cross-section between opposed heated rollers in which sets of rollers operate successively at 180° angles and roll the circular cord into a square or rectangular cross-section.

Figure 5:
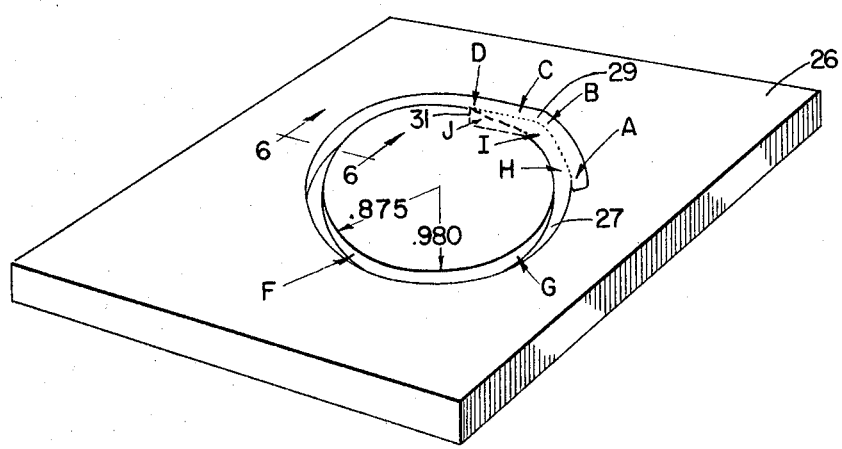
FIG. 5 is a perspective view of a mold which is suitable for preparing the gasket.
Figure 6:
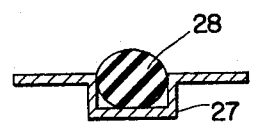
FIG. 6 is a cross-sectional view taken on a line 6—6 of FIG. 5 and shows an elastomeric cord of circular cross-section in the uncompressed state from which a gasket is made.
Figure 7:
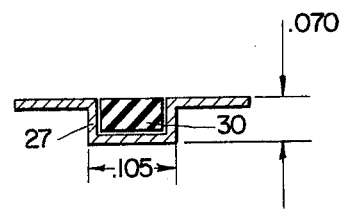
FIG. 7 is a vie wof the elastomeric cord of FIG. 6 compressed to a shape having a rectangular cross-section.

Gaskets of accurate rectangular cross-section can be fabricated from a mold which is illustrated in FIG. 5 of the drawing. It consists of a metal plate 26 having a circular channel 27 of the general configuration shown. The channel is of rectangular cross-section as shown in FIGS. 6 and 7. An operative mold is one in which the circular channel has an inner radius of .875 inch and an outer radius of .980 inch and is adapted to form a gasket of rectangular cross-section having a thickness of .070 inch and a breadth of .105 inch. In making the gasket, a strip of unvulcanized butyl rubber cord 28 having a circular cross-section of .100 inch, was pressed into the channel at the site marked A and successively moved into positions B, C, D, E, F, G, and H. As the cord was moved into positions I and J, it overlapped with the first length A to D to form a division 29, shown as a line of interrupted dots. The cord was cut at point 31 to fit into the pocket at J.

After the cord was fitted into the channel, a layer of Teflon-coated fiberglass was placed over the mold and the assembly was passed into a press heated to 250° F. and held at this temperature for approximately one minute. The press residence time was such that plastic flow occurred but not vulcanization. This caused the circular cord to adopt the rectangular cross-section of the mold, shown at 30, FIG. 7, and also caused partial coalescence of the adjacent surfaces of the overlapped cord along the division line 29 which forms the tear line 13. Since the total motion of the rubbery stock is very slight, there was very little mixing of molecules between the two surfaces of the cord along the line 29.

The gasket thus formed with a tangential tail 11 at site A may either be vulcanized directly in the mold by heating to 350° F. for 15 minutes, preferably under steam pressure, or the mold may be cooled to room temperature then removed and transferred to a vulcanizing oven or retort. The section of the gasket residing within the broken line area J is then severed at some stage before the gasket is placed on a jar. If the gasket is vulcanized completely in the mold, then the section in area J is also vulcanized and must be discarded. On the other hand, if the mold is cooled and the gasket is removed before vulcanization, then the rubber in area J may be severed and reworked in an extruder so that there is no loss of material.

Of course, cements of the rubber dissolved in a solvent, such as one composed of 20 percent rubber and 80 percent cyclohexane, may be used to bond the gasket at the tear line 13. Care should be exercised in the use of such materials because if the solvent is not substantially completely removed before vulcanization the gasket is apt to blister and form bubbles at the line 29. Such blistering and bubble formation provides a direct leakage path between the exterior environment and the contents of the jar. Bubble formation is completely avoided by molding the solid, solvent-free rubber cord under gentle heat as previously described.

After vulcanization, the gaskets are transferred to a distributor for fitting on the neck of a container.

While this invention has been described with respect to placing the gasket between the bead of a screw-type cap and a rib which projects outwardly on the neck of a container, the gasket is effective in other modifications so long as it is positioned intermediate the cap and container. For example, an effective seal can be made by seating the gasket on the top edge of the mouth of a container and then placing a disc or panel-type cover thereon. In assembled relationship, the cover may be held in place by vacuum and the gasket effects a good seal.

I claim:
1. A method of preparing an integral sealing gasket which comprises providing a predetermined length of a strip of vulcanizable resilient material having its side walls lying solely at right angles and having one longitudinal end running diagonally from one side wall to the other side wall, overlapping the opposed longitudinal end over the diagonal end to form a continuous band, and heating the overlapped band for a time sufficient to cause plastic flow but insufficient to cause vulcanization, whereby the opposed ends are severably joined with the outer end extending tangentially to the curvature of the band.
2. A method according to claim 1 wherein the heated band is cooled and subsequently vulcanized.
3. A method according to claim 2 wherein the resilient material is a polymer of isobutylene.

References Cited by the Examiner
UNITED STATES PATENTS
3,026,569   3/1962   Keller _____ 264—325

ROBERT F. WHITE, *Primary Examiner.*
R. B. MOFFITT, *Assistant Examiner.*